July 3, 1951 M. CAMRAS ET AL Re. 23,383

COUPLING CIRCUIT FOR MAGNETIC RECORDERS

Original Filed Dec. 26, 1942 4 Sheets-Sheet 1

Inventors
MARVIN CAMRAS.
RAYMOND E. ZENNER.
by Charles W. Hills Attys.

COUPLING CIRCUIT FOR MAGNETIC RECORDERS

Original Filed Dec. 26, 1942 4 Sheets-Sheet 2

INVENTORS
MARVIN CAMRAS.
RAYMOND E. ZENNER.
BY Charles W. Hills ATTY.

COUPLING CIRCUIT FOR MAGNETIC RECORDERS

Original Filed Dec. 26, 1942 4 Sheets-Sheet 3

Inventors
MARVIN CAMRAS.
RAYMOND E. ZENNER.

by Charles W. Hills Attys.

COUPLING CIRCUIT FOR MAGNETIC RECORDERS

Original Filed Dec. 26, 1942 4 Sheets-Sheet 4

INVENTORS
MARVIN CAMRAS.
RAYMOND E. ZENNER.
BY Charles W. Hills
ATTY.

Reissued July 3, 1951

Re. 23,383

UNITED STATES PATENT OFFICE 23,383

COUPLING CIRCUIT FOR MAGNETIC RECORDERS

Marvin Camras, Chicago, and Raymond E. Zenner, Brookfield, Ill., assignors to Armour Research Foundation of the Illinois Institute of Technology, Chicago, Ill., a corporation of Illinois Original No. 2,416,610, dated February 25, 1947, Serial No. 470,209, December 26, 1942. Application for reissue December 5, 1947, Serial No. 790,004

4 Claims. (Cl. 179—100.2)

Matter enclosed in heavy brackets [ ] appears in the original patent but forms no part of this reissue specification; matter printed in italics indicates the additions made by reissue.

This invention relates to improvements in a magnetic recorder of the type which makes a sound recording on an elongated paramagnetic recording medium by successively magnetizing the medium in accordance with variations in sound as the medium travels through the recorder, the particular invention being very highly desirable for use on airplanes, patrol boats, and other vehicles which may for some reason become out of contact with headquarters, although the invention will have other uses and purposes as will be apparent to one skilled in the art.

Magnetic recorders for airplanes, as well as other vehicles normally crowded with instruments, should be extremely compact and extremely light in weight. In many cases it is also desirable to have them portable rather than built in or seated within a built-in receptacle. The uses of the magnetizing devices are many indeed, both for military and civilian work, such as observation or recognizance recordings, establishment of flight logs, recording of all conversation between parties in the vehicle, instructor and student conversations, etc., thereby giving records of the particular trip far more complete than are available by other methods. Consequently, it is desirable to have these devices functioning at all times, and repairs, when necessary, should be extremely simple to make, or even possible for the occupant of the vehicle to make in a very short time while still operating the vehicle. Likewise, the outside connections should be simple. Further, in the conservation of space, lightness of load, etc., it is desirable to take all possible advantage of the equipment incorporated in the recording device.

With the foregoing in mind, it is an important object of the instant invention to provide a magnetic recording device of extremely compact construction which is highly economical to both manufacture and operate.

Another object of the invention is the provision of a magnetic recording device of compact construction, which with the exception of the driving member for movable parts, carries all the necessary amplifying circuit and other energizing means necessary in the making of a recording.

Still another object of the invention is the provision of a magnetic recording device in which substantially all of the wiring and associated apparatus necessary for the making of a recording are carried in a unitary container which may be readily removed and replaced, so that if anything in connection with the recording circuit becomes out of order, it is a simple expedient to remove the entire container, replace it with a new one, and proceed to operate the device. The removed container may then be examined at leisure and repairs made to its contents without incapacitating the device or delaying the use of the device. A spare container may be carried by the pilot of an airplane, or the operator of some other vehicle, and if anything goes wrong with the recording circuit connections, it is a very simple operation for him to remove a container from the machine and slip in the substitute container.

Also a feature of the instant invention is the provision of a magnetic recording device wherein advantage may be taken of certain of the apparatus embodied in the device to perform additional functions normally considered outside the scope of the device.

A further feature of the invention resides in the provision of a magnetic recording device including an amplifying circuit, which circuit may function as the amplifier for an intercommunication system between the pilot of the vehicle and any others aboard the vehicle, so that a separate intercommunication system is not necessary when the magnetic recording device is used on a particular vehicle.

Still another object of the invention resides in the provision of a magnetic recording device which may be associated with the intercommunicating system on a vehicle in such a manner that the device will "listen in" and also make a record of the entire conversations between parties in the vehicle.

Another object of the invention is the provision of a magnetic recording device in which the moving parts may be driven from the battery normally associated with a vehicle in which the device is being carried, the device being equipped with its own speed control means.

Still another object of the invention is the provision of a magnetic recording device of simplified and compact construction, wherein the entire mechanism is carried by two frame panels held in confronting spaced relation with each other.

An additional feature of the invention resides in the provision of a magnetic recording device equipped with a unified form of level winding device to control the proper unwinding of the recording medium from one spool and the proper winding of that medium on another spool.

A still further feature of the invention resides in the provision of a compact magnetic recording device in which the recording medium is wound off one spool and onto another spool, with the device equipped with means to prevent coasting or over-run at either spool so as to maintain at all times the proper tension on the recording medium.

Still another object of the invention resides in the provision of a compact and simplified magnetic recording device wherein only one external connection is necessary, that is, all connections with the device being made at one point.

While some of the more salient features, characteristics and advantages of the instant invention have been above pointed out, others will become apparent from the following disclosures, taken in conjunction with the accompanying drawings, in which.

As shown on the drawings.

Figure 1:
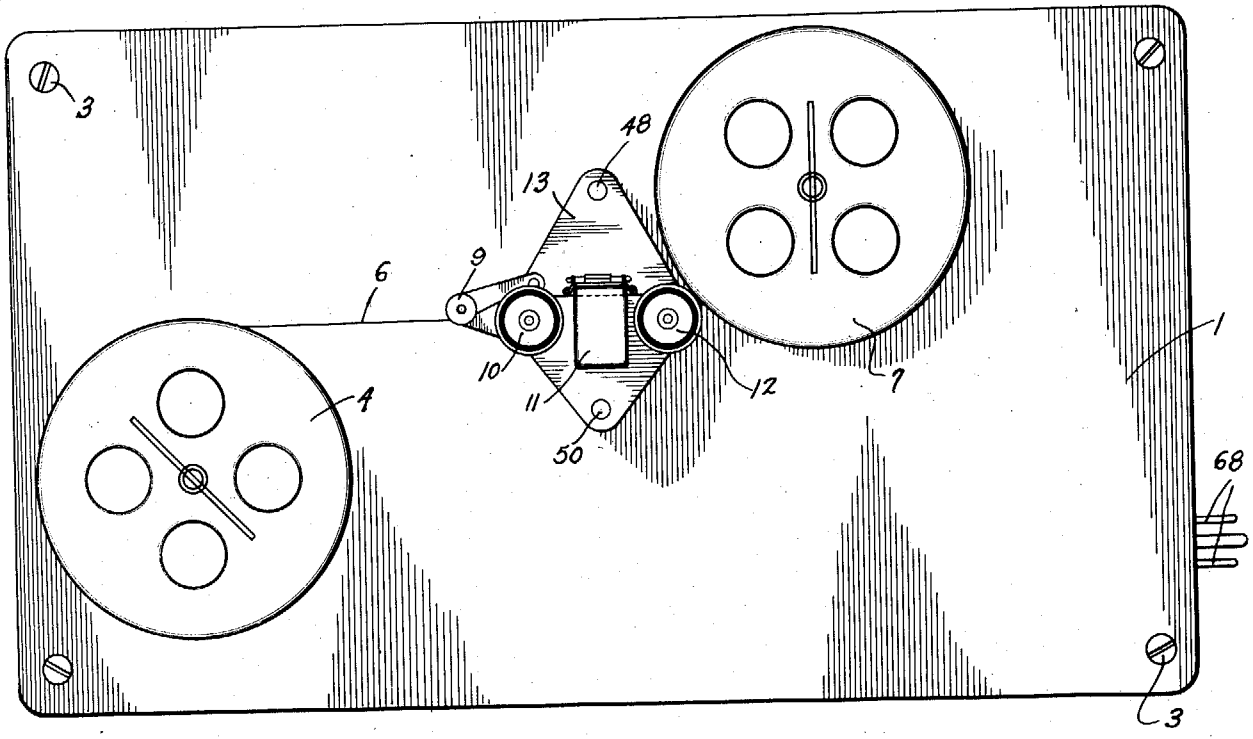
Figure 1 is a side elevational view of a magnetic recording device embodying principles of the instant invention.

The illustrated embodiment of this invention as shown includes only the necessary structural or frame parts, and any exterior decorative, fireproof, or other type of cover or container has been omitted for purposes of clarity, since the device as illustrated may be incorporated in any suitable form of transporting container, built-in receiving device, etc., as may be most desired.

In the illustrated embodiment of this invention there is shown a pair of spaced confronting panel members 1 and 2 which support all of the structure embodied in the invention, and which may be of any suitable material such as metal, plastic, etc. These panel members 1 and 2 are held in fixed spaced relationship relatively to one another by a plurality of bolt and sleeve connections 3, one in each corner region of the panels. It will be understood that all cross shafts are suitably supported where necessary, adequate bearings for the journals being used where necessary, and if the shaft is normally stationary, a proper mounting will be associated with each panel, it not being necessary herein to describe such details of construction.

On the outside of the panel 1 a reel 4 is mounted on the projecting end of a shaft 5, which is rotatable but undriven. This reel or spool 4 carries a recording medium which, in the illustrated instance, is in the form of a fine round wire 6 and is the supply spool from which the wire 6 is wound onto another similar reel or spool 7 carried on the projecting end of a driven shaft 8. As the wire 6 travels from the spool 4 to the spool 7, it first passes under a positioning pulley 9, then a guide pulley 10, then through or over a magnetic recording head disposed in a casing 11, thence over another guide pulley 12 and to the spool 7. The positioning pulley, both guide pulleys, and the recorder head in its casing 11, are all mounted upon a reciprocable carrier 13 associated with level winding equipment, this entire carrier moving backward and forward to insure a level winding of the wire 6 upon the spool 7.

Figures 2, 4, 5:
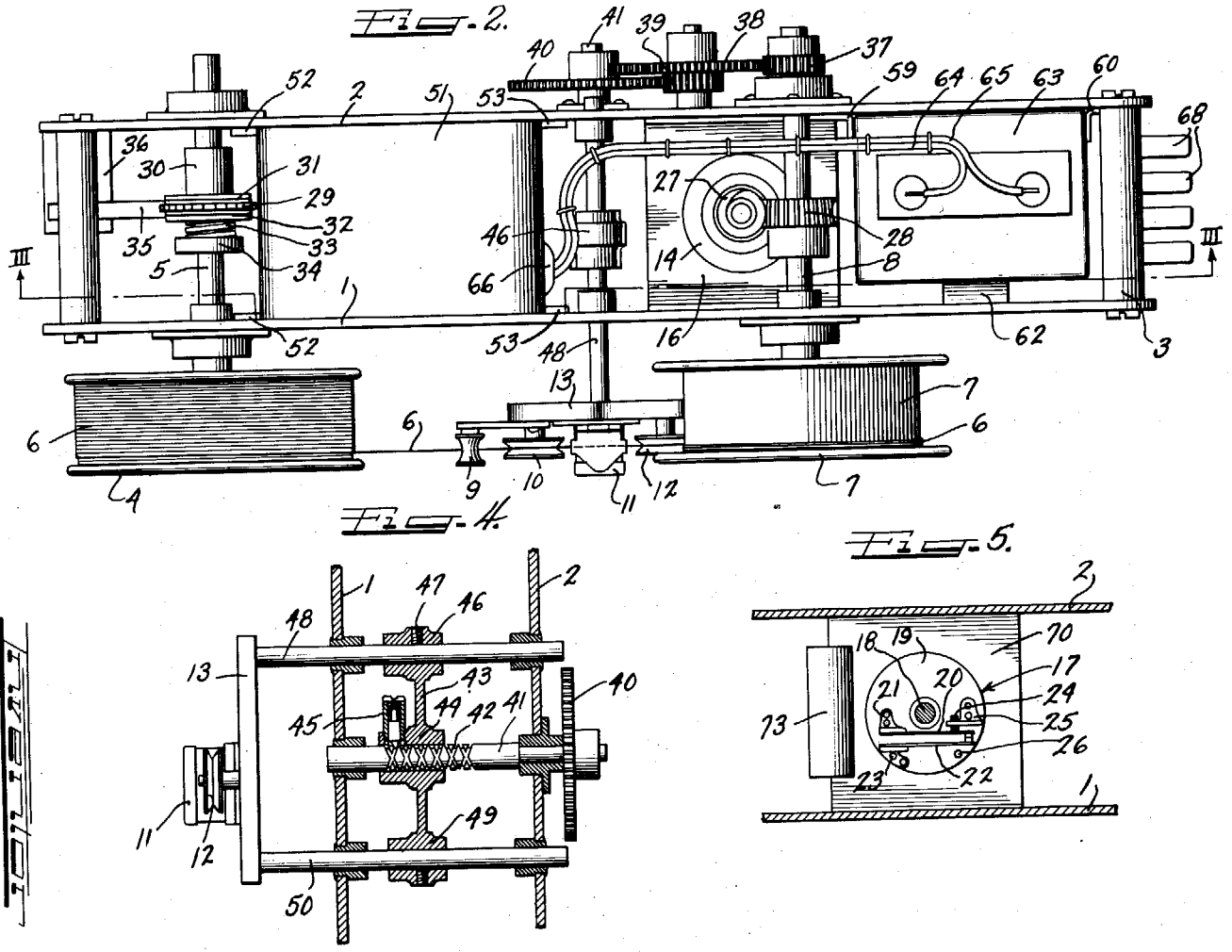
Figure 2 is a top plan view of the structure of Figure 1, with certain parts removed for purposes of clarity.
Figure 4 is a fragmentary transverse vertical sectional view through the level winding arrangement, taken substantially as indicated by the line IV—IV of Figure 3.
Figure 5 is a fragmentary plan sectional view of the governing arrangement, taken substantially as indicated by the line V—V of Figure 3.

With reference more particularly to Figure 2, it will be seen that the positioning pulley 9 is of such shape as to tend to position the wire 6 so that any final straightening may be done by the guide pulley 10. Even though the wire 6 may be out of alignment on the reel 4, the pulley 9 is so shaped that it together with pulley 10 will center this wire with respect to the recording head. The guide pulleys 10 and 12 are so positioned as to hold the wire properly in contact with the recording head. All of the pulleys 9, 10 and 12 are merely mounted on sub-shafts for free rotation by the friction of the wire passing over these pulleys.

As the wire 6 traveles through the recording head in the casing 11 the wire is magnetized in accordance with whatever sound is received by a pick-up microphone and by means of an electrical circuit to be later described. Thus, a recording is made on the wire which recording may be later reproduced from the wire at some other location with suitable reproduction equipment. In the event the device is used in an airplane, or some other vehicle, conversations between occupants of the vehicle may be recorded on the wire for later reproduction.

Figure 3:
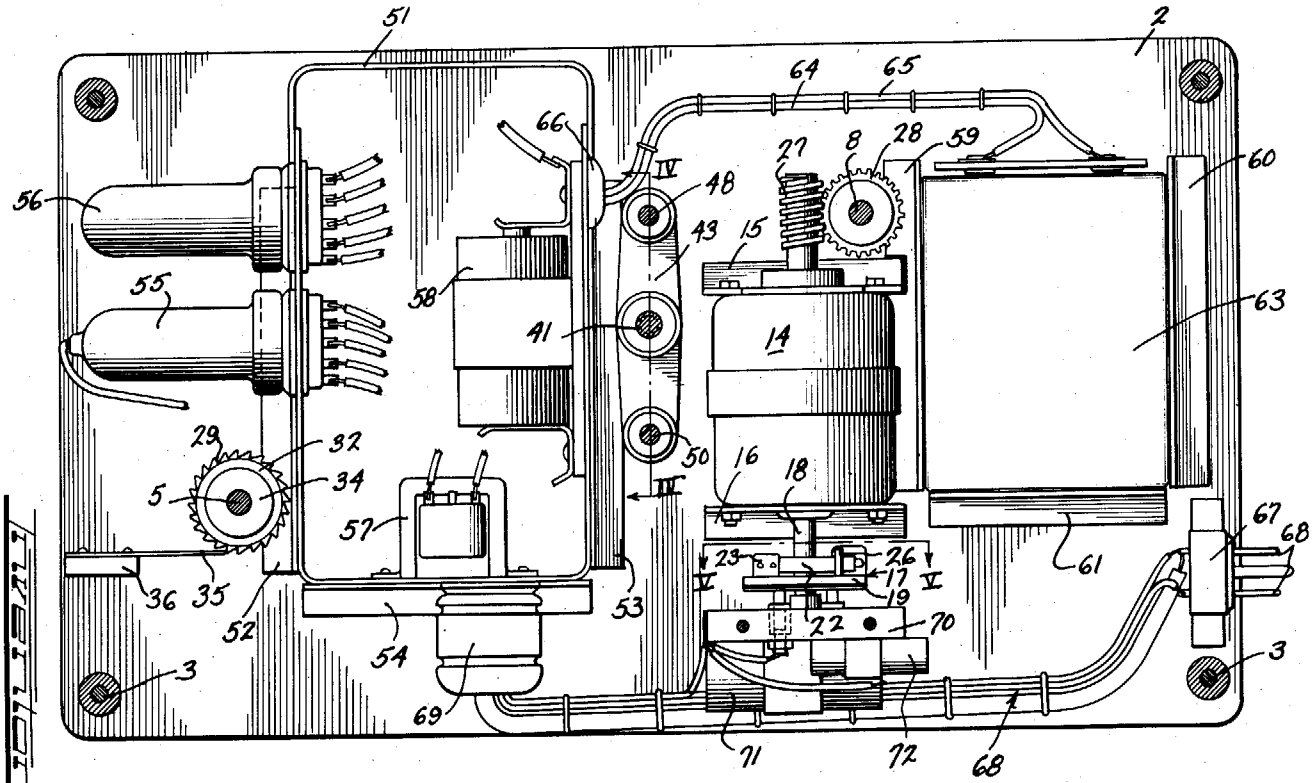
Figure 3 is a fragmentary vertical sectional view, with parts omitted, taken substantially as indicated by the staggered section line III—III of Figure 2, looking in the direction of the arrows.

During operation, the wheel 7 is driven and pulls the wire 6 from the reel 4 over the pulleys 9, 10 and 12 and through the recorder head casing 11. All of the pulleys as well as the reel 4 turn in response to the pull of the wire. The drive means for actuating the reel 7 includes an electric motor 14, seen best in Figure 3, which motor is carried between a pair of suitable transverse supports 15 and 16, spot welded or otherwise secured to the supporting panels 1 and 2. This motor may be energized by current from any suitable source, such as the battery carried by the vehicle in which the device is being used. In order to maintain a constant speed of the motor, and therefore a constant movement of the recording medium or wire 6, the motor is preferably self-governed, and to that end a centrifugal governing arrangement generally indicated by numeral 17 is carried by the motor shaft 18. This governing arrangement is best seen in Figures 3 and 5, and includes a disk 19 on the motor shaft, on which disk is a laterally extending contact arm 20 attached at one end to an upstanding bracket 21. Opposite the contact arm 20 is another similar contact arm 22 attached at one end to a similar bracket 23. While the motor is running at a predetermined speed, these contact arms remain in position with their respective contact points closing a circuit. A stop member 24 carried in a bracket 25 determines the position of the contact arm 20. The contact arm 22 is free to move away from the contact arm 20 and centrifugal force due to the speed of rotation is sufficient to overcome the inherent tendency of the spring contact arm 22 to remain in original position. An upstanding stop member in the form of a post 26 limits the circuit breaking movement of the contact arm 22.

As will more fully later appear, the contact arms 20 and 22 control the circuit through the motor 14. In the event the motor runs beyond a predetermined speed, the contact arm 22 will move away from the contact arm 20 and thus open the circuit, and the circuit will remain open until the motor reduces speed sufficiently for the spring contact 22 to overcome the centrifugal force and again close the circuit. Thus, during operation, the motor and likewise all parts driven by the motor, including the spool or reel 7, will be actuated at substantially constant speed.

The drive connection between the reel 7 and the motor includes a vertically disposed worm gear 27 on the upper end of the motor shaft, enmeshed with a worm wheel 28 keyed to the aforesaid shaft 8.

During operation of the recording device, it is preferable to maintain a predetermined tension on the wire 6 above the tension necessary to rotate the reel 4, in order to eliminate possible breakage of the wire and also in order to eliminate wastage of the wire. Further, it is desirable to prevent over-run of the wire due to coasting of the reel 4 in the event a sudden stop is made. To this end, a floating ratchet wheel 29 is freely carried by the shaft 5 on the outer end of which the reel 4 is affixed. On one side of this ratchet wheel is a collar 30 fixed to the shaft and carrying a friction clutch plate 31. On the opposite side of the ratchet wheel is a friction clutch plate 32 keyed to the shaft 5, but slidable thereon, and this clutch plate is urged into side surface contact with the ratchet wheel by means of a suitable spring 33 bearing against the plate at one end and against a fixed collar 34 at the other. A detent 35 carried on a supporting member 36 is in engagement with the ratchet wheel to prevent rotation of this wheel in a forward direction or in the direction of movement of the reel 4 when the wire 6 is being wound onto the reel 7. When the reel 4 rotates forwardly, the ratchet wheel is held stationary by the detent. Consequently, friction clutch engagement with both sides of this ratchet wheel provides a frictional tension tending to resist rotation of the reel 4, and therefore a predetermined tension is on the recording medium or wire 6 at all times during movement of the wire. In the event a sudden stop occurs, the friction clutch engagement with the ratchet wheel prevents any overrun of the reel 4, and thus the unintentional production of a slack loop in the wire 6.

When reels are changed, or after reconnection of the wire 6 following a breakage, or for some other reason when some adjustment is made in the wire, the engagement of the detent 35 with the ratchet wheel 29 permits a free backward rotation of the shaft 5 so that the wire may be initially stretched taut prior to beginning operation.

The level winding arrangement is also driven through a gear train from the motor 14. Obviously, the level winding arrangement must operate at a much slower rate of speed than the reel 7 rotates. Therefore there is a reduction gear train involved including a gear 37 on the rear end of the shaft 8 carrying the receiving reel or spool 7, which gear is enmeshed with the larger gear 38 carried on a stub-shaft together with a smaller gear 39 which meshes with a larger gear 40 on a shaft 41. This shaft 41, as best seen in Figure 4, is provided with reverse screw level winding slots 42. A yoke or link 43, provided with a hub 44, floating over the reverse screw slot 42, carries a level wind rider 45 which moves the yoke back and forth along the shaft 41 as this shaft 41 rotates continuously in one direction. At one end thereof, the yoke 43 has a hub 46, locked as indicated at 47 to a slidable supporting rod 48 attached to the aforesaid carrier 13 and freely slidable in suitable bearing members in the supporting panels 1 and 2. At the lower end thereof the yoke is provided with a similar hub 49 locked to a similar slidable supporting rod 50 which is also fixedly attached to the same carrier 13. It is therefore apparent that as the shaft 8 carrying the receiving spool 7 is rotated by the motor 14, the shaft 41 will be rotated in the same direction through the above described gear chain, and as this shaft 41 rotates the supporting rods 48 and 50 will be moved in and out axially a distance corresponding to the length of the reverse screw slot 42, thus moving the pulleys 9, 10 and 12 together with the recording head in the casing 11 backward and forward across the circumferential surfaces of the reels 4 and 7 and effectively cause a level winding of the recording medium on the receiving reel 7.

Figures 6, 7:
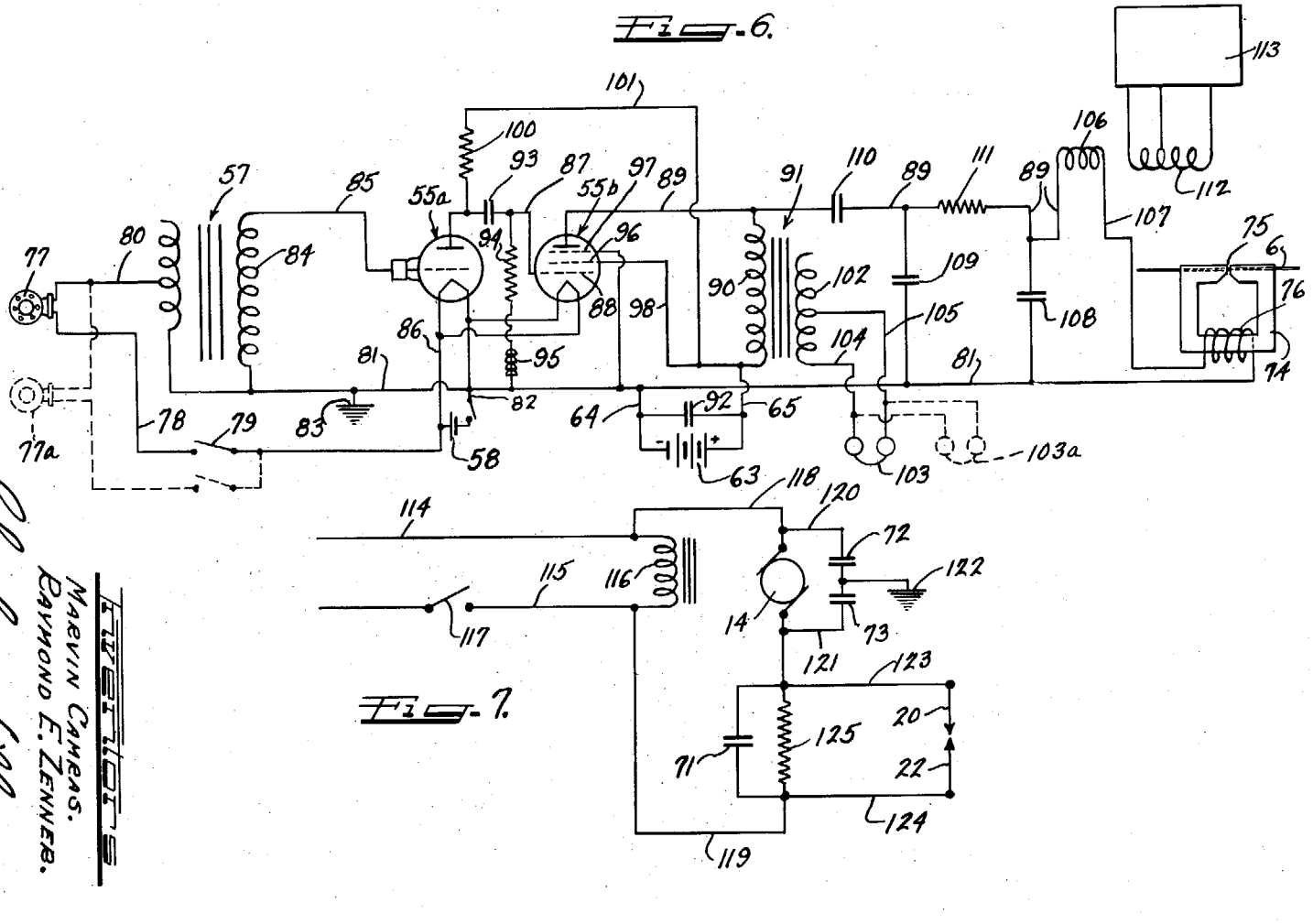
Figure 6 illustrates a simplified schematic diagram of the amplifying, recording, and intercommunicating circuit.
Figure 7 is a simplified schematic diagram illustrating the circuit connections for the driving member.

With the exception of the energy for operating the motor 14, all of the power necessary for the amplifying and oscillating circuits, as well as these circuits, are contained within the structure disposed between the supporting panels 1 and 2. The main amplifying and oscillating circuit including the necessary vacuum tubes, as well as the necessary transformers, are all packed within or mounted on a container 51 which is illustrated in the form of a rectangular open-sided box, and this container is slidable in the manner of a drawer between the panels 1 and 2 and in tracks defined by a pair of spaced angle bars 52 and 53 on each of the panels 1 and 2. The drawer or container 51 seats on a similar pair of angle bars 54, one on each of the panels 1 and 2, as best seen in Figures 2 and 3. In one of the side walls of the container 51 sockets are provided for accommodating two vacuum tubes 55 and 56, these being all of the vacuum tubes necessary with the particular circuit utilized in the illustrated form of the invention. The tube 55, as will more fully later appear herein, is a composite tube embodied in the amplifying circuit, and is illustrated in the diagram of Figure 6 for purposes of convenience as two separate tubes 55a and 55b, although in actual practice it is preferably to utilize a composite tube embodying all of the structure and characteristics of both tubes 55a and 55b in a single tube 55. The tube 56 is incorporated in the oscillating circuit.

The drawer or container 51 also carries the necessary transformers such as the transformer 57 visible in Figure 3, and also carries one of the power sources in the form of a battery 58. The structure is illustrated in Figure 3 in a somewhat diagrammatic form, the connections being broken away, but it is to be understood that the various connections of the transformers and other associated apparatus will be contained within the drawer 51 as much as possible, and these connections are best shown in the diagram of Figure 6.

Another supporting arrangement in the form of a pair of spaced angle rails or tracks 59 and 60 is mounted on the panel 2 which, together with a bottom rail 61 also on the panel 2 (Figure 3) and another vertical rail 62 on the inside of the panel 1 (Figure 2) provide a receiving socket for a B-battery 63. In view of the fact that if anything becomes wrong with the B-battery it is only necessary to substitute a new battery for the old one, it is not necessary to include the B-battery 63 within the above discussed drawer or container 51. The B-battery is merely connected by a pair of conductors 64 and 65 to a plug connector 66 engageable in a suitable socket in the wall of the container 51, as seen clearly in Figure 3.

It is desirable, for the sake of simplicity and expediency, to have only one connection from outside apparatus to the magnetic recording device. To this end, the illustrated embodiment of the invention is so constructed and arranged that it is only necessary to connect one socket connector with a plug connector 67 located between the panels 1 and 2 with its projecting contact members 68 extending beyond the area defined by the panels, as seen in Figures 2 and 3. From this plug 67 various leads generally indicated by numeral 68 extend to connections for the motor 14, and also to a plug 69 which may be engaged with a complementary connector in the bottom of the drawer or container 51. The single plug 67 is sufficient for connecting the battery of the vehicle to the motor to drive the latter, and also to connect earphones, microphones, and similar apparatus with the recording circuit. Thus, the earphones and microphones may be located at any convenient place in the vehicle, together with the necessary switches for energizing them, and have conductors therefrom extending to one single plug. The conductors from the vehicle battery may also extend to the same plug. It is a simple expedient when the magnetic recording device is placed in position to connect that plug to the device, and everything including intercommunication between the occupants of the vehicle and making of a recording is ready for operation.

With reference to Figure 3, it will be seen that a suitable platform 70 supports connections to the motor by way of the automatic governing device 19, and this platform also carries several condensers 71 and 72 and 73, the latter being seen in Figure 5, associated with the motor circuit as will more fully later appear herein.

The recording head contained in the casing 11 is best seen in Figure 6 and includes a core 74, preferably laminated, and is substantially rectangular in shape with the exception of a rather minute air gap 75 dividing the upper leg of the core so as to provide opposed pole faces adjacent the air gap. The recording medium or wire 6 travels through a slot in the upper leg of the core as indicated by dotted lines in Figure 6. A magnetizing coil 76 is wound around one leg of the core and the impulses through this coil 76 are of varying magnitude in keeping with the variation of the voice or other sound being recorded. The impulses from the coil 76 are transferred to the wire 6 in the form of magnetizations of the wire. As the wire travels through the slot in the pole faces, successive increments of the wire are magnetized in the region of the air gap 75 in accordance with the sound being recorded.

In Figure 6 a diagram of a suitable circuit arrangement for the proper operation of the magnetic recording device in both its phase as a recorder and as a means of intercommunication is schematically illustrated. In this circuit the particular batteries, conductors, tubes and similar apparatus above referred to in connection with the showings in Figures 2 and 3 are included and, of course, carry the same reference numerals.

This circuit includes the battery 58, carried in the container 51, connected to energize a microphone 77 or equivalent pick-up device, the current passing from the battery through a conductor 78, provided the manually controlled switch 79 is closed, to the microphone, and from the microphone through a conductor 80 to the primary of a step-up transformer 57, and from the primary through conductors 81 and 82 back to the opposite side of the battery 58. As indicated by dotted lines in this figure, a second microphone 77a may be connected in parallel with the microphone 77, and likewise as many microphones or other pick-up devices as may be desired may be similarly included in the circuit. As indicated at 83, the conductor 81 is preferably also grounded.

As pointed out above the vacuum tubes 55a and 55b, in actual practice, are preferably embodied in a single tube 55, but for purposes of clarity the composite tube is separated into its constituent parts in the wiring diagram, and 55a is indicated in the circuit as the first stage of amplification, while tube 55b provides the second amplification stage. By means of these amplification stages, the stepped-up voltage from the secondary of the microphone transformer 57 is successively amplified.

The secondary 84 of the microphone transformer 57 is connected at one end to the aforesaid conductor 81, and thus through conductor 64 to the B-battery 63. The other end of the secondary 84 is connected through conductor 85 to the grid of the tube 55a. The filament of the tube 55a is heated by the battery 58 through conductors 82 and 86, and the filament of the tube 55b is parallel with the filament of the tube 55a.

Thus, it will be seen that stepped-up voltages of varied intensities are induced in the secondary 84 of the transformer 57 by variations of sound picked up by the microphone 77, and these stepped-up voltages are applied across the grid and filament of the tube 55a. The output voltage from the tube 55a is applied across the grid and filament of the second amplifying tube 55b through a conductor 87 connected to a grid 88 of the tube 55b. The output from the tube 55b is applied through conductor 89 leading from the plate of this tube to a primary coil 90 of a step-down transformer 91, the other end of the primary coil being connected through conductor 65 is to the opposite side of the B-battery 63, thus completing the circuit through the two stages of amplification, the B-battery, and the input and output transformer coils. A condenser 92 is preferably connected across the battery between conductors 64 and 65 to prevent alternating current from reaching the B-battery 63. A coupling condenser 93 is included in the conductor 87 leading from the plate of tube 55a to the grid 88 of 55b, to reduce the passage of low frequency voltage in this conductor. The grid 88 of the tube 55b is biased by a resistance 94 and a set of biasing cells 95 connected in series between conductors 87 and 81. Biasing potentials are also provided in the tube 55b by means of an extra pair of grids 96 and 97, the grid 96 being connected through conductor 98 to one side of the B-battery 63 and to one end of the primary 90 of the output transformer 91; and the grid 97 is connected through conductor 99 to conductor 81 leading to one side of the battery 58. A plate coupling resistor 100 is also preferably connected by conductor 101 between the plate of the tube 55a to the conductor 98 leading from the grid 96 of tube 55b.

In that part of the major circuit already described, we now have impulses from the sounds picked up by the microphone or other pick-up device 77 amplified and applied across the primary 90 of the output transformer 91. This output transformer is a step-down transformer and its secondary 102 feeds a pair of earphones 103 or other listening device through conductors 104 and 105. As indicated in dotted lines, another listening device 103a, or as many more as may be desired, may be connected in parallel with the listening device 103. Thus, one occupant of the vehicle carrying the present invention may have earphones 103a and microphone 77a, while another occupant may have earphones 103 and microphone 77, and these occupants may converse between themselves utilizing the magnetic recording device only, there being no need for a separate intercommunicating system in the vehicle wherein the magnetic recording device is utilized.

The primary 90 of the output transformer 91 is in circuit connection with the magnetizing coil 76 associated with the recording head. The conductor 89 may be extended from the point where it connects with one end of the primary coil 90 to an end of an inductance coil 106, and a conductor 107 is connected to the other end of the coil 106 and to one end of the magnetizing coil 76. To the other end of the magnetizing coil and extension of the aforesaid conductor 81 is connected which returns to conductor 64 from the B-battery 63. A condenser 108 is connected between conductors 89 and 81 and is in parallel with the coil 106 and the magnetizing coil 76 in series. This condenser 108 is of such value that the coils 106 and 76 are resonated in proper frequency, and it will be noted that the use of the condenser 108 not only tunes the magnetizing coil 76 to give parallel resonance between the condenser 108 and the magnetizing coil, but this arrangement in addition provides a marked economy in the use of various coils and inductances.

The primary 90 of the transformer 91 is tuned to a resonant condition by a condenser 109 connected between the conductors 89 and 91 on the transformer side of the connections for the condenser 108. A blocking condenser 110 is incorporated in the conductor 89 near the primary of the transformer 91, and this blocking condenser together with the aforesaid condenser 92 across the battery conductors 64 and 65 constitute a low impedance input path to the magnetizing arrangement. A resistor 111 of very high resistance is also preferably included in the conductor 89 between the connections for the condensers 109 and 108 to provide a low degree of coupling between the above described resonant circuits.

The necessary high frequency voltage for the proper functioning of the magnetizing coil 76 is induced into the circuit by way of the inductance coil 106 which is inductively coupled to an inductance coil 112 of an oscillating circuit or arrangement generally indicated by numeral 113 which includes the oscillating tube 56 seen in Figure 3, and which need not be specifically described herein, since the performance of such an oscillating circuit is understood by those skilled in the art. The high frequency voltage induced in circuit with the coil 106, the magnetizing coil 76, and the condenser 108 (this condenser passing high frequency) enables the magnetizing coil 76 to successively magnetize passing increments of the recording medium 6 in keeping with variations in the sound picked up by the microphone 77.

It will also be especially noted that with the tuned circuit arrangement including the magnetizing coil 76 any conversation between occupants of the vehicle carrying the recording device, the occupants utilizing the earphones 103 and 103a and the microphones 77 and 77a, will be picked up and recorded on the recording medium 6. In other words, the magnetizing device will "listen in" on all conversations between occupants of the vehicle and make a recording of those conversations. In the event the vehicle is an airplane, all conversations between the pilot and some other occupant of the vehicle, or straight flight log by the pilot, will be recorded for future reference, and in the event that airplane should crash, and even though the magnetic recording device is substantially wrecked by virtue of such crash, there will remain a recording of events up to the time of the crash on the recording medium 6. That medium may then be rescued from the wreckage, it being preferable to enclose the magnetic recording device in a fireproof location, and the events leading up to the time of the accident will be preserved.

It should further be noted that the circuit arrangement possesses a distinct advantage over previous circuit arrangements of which I am aware in that with the particular circuit connections from the primary of the transformer 91 to the recording head the maximum possible voice energy above background noise is recorded on the wire 6, and compensation is made not only for wire characteristics but also recording head characteristics. It will be appreciated that the high frequency portion of the circuit including the condenser 108, the coupling coil 106 and the recording coil 76 is isolated by virtue of the high resistance 111. As stated above, the manner of providing a resonant condition for the primary of the transformer 91 by the use of the tuning condenser 109 and the manner of providing a resonant condition between the coupling coil 106 and the magnetizing coil 76 by the use of the condenser 108, provides distinct advantages in simplicity of connections and economy of material and parts.

The necessary circuit connections from the battery of the vehicle to the motor 14 are illustrated in Figure 7. Line conductors 114 and 135 may be connected to any suitable source of power, such as the vehicle battery, and extend to field winding 116 of the motor. One of these conductors, in the illustrated instance the conductor 115, is provided with a suitable switch 117. Conductors 118 and 119 extend from the conductors 114 and 115 respectively to opposite sides of the armature of the motor 14, so that the armature is parallel with the field winding. Parallel with the armature by conductors 120 and 121 is a pair of condensers 72 and 73, also seen in Figures 3 and 5, and this circuit arrangement is grounded between the condensers as indicated at 122. These condensers 72 and 73 are preferably connected by very short leads on opposite sides of the motor armature and are for the purpose of eliminating noise, especially that created by any arcing that may occur at the motor brushes. The aforesaid contact arms 20 and 22 of the motor governing arrangement seen in Figure 5 are connected to the conductor 119 by leads 123 and 124. A resistance 125 is preferably embodied in the conductor 119 in parallel with the contact arms 20 and 22. Likewise, the condenser 71 is also preferably parallel with both the resistance and the contact arms. This condenser 71 is for the purpose of quenching any arcs that may occur during the making and breaking of the circuit between the contact arms 20 and 22 and to prevent undue burning of the contact points carried by these arms. It will thus be seen that suitable precaution for the elimination of noise and protection of parts of the apparatus have been taken in the relatively simple form of motor circuit incorporated in the instant invention.

In actual use, it is a simple expedient to place the magnetic recording device in proper position in an airplane or other vehicle, and with the single connection to the plug 67 and terminals 68 of the recording device have the entire apparatus set up for the purpose of making recordings and for intercommunication between the occupants of the vehicle. The pilot may carry an extra container of the major circuit for the apparatus, such as the container 51, if so desired. If, for any reason, the apparatus then ceases to function, and in most instances that would be by virtue of the burning out of one of the vacuum tubes, the dying of the battery 58, or some other logical cause in the electrical circuit, it is a very simple expedient for the pilot to merely pull out the plugs 69 and 66, remove the entire container 51, insert a substitute container 51, replace the plugs 69 and 66, and the entire device is ready for instant use. The operation of substituting another container 51 for the one already in use would require but a very short interval of time. The defective circuit arrangement in the removed container 51 may be then repaired at a convenient time in a ground laboratory without requiring the loss of service of the device when needed. Likewise, if the B-battery 63 should play out, it is a simple expedient to remove the plug 66, slide the B-battery out, and insert a new B-battery already equipped with a plug 66 and insert the plug in the container 51. As will be apparent to one skilled in the art, the facility of removing and replacing salient parts of the apparatus so that defective parts may be repaired at a convenient time and without loss of functioning of the apparatus, lends the invention to uses and purposes too numerous to specifically mention herein.

From the foregoing, it is apparent that we have provided a magnetic recording device not only capable of functioning as such, but also capable of the additional function of providing a means for intercommunication with the occupants of the vehicle without the necessity of utilizing any apparatus other than that associated with the recording device. It will also be appreciated that the device may be repaired at leisure without loss of its function merely by the simple substitution of salient parts of the device. Further, it will be noted that the device is self-governing, and the entire mechanism is simple in construction, occupies a minimum of space, and is so arranged as to provide extremely high efficiency with comparatively few parts. Further, it will be appreciated that the device may be economically manufactured and used.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In an electrical circuit for a magnetic recording device wherein successive increments of a traveling recording medium are magnetized in accordance with impulses being recorded, an oscillatory circuit including an oscillating coil, *and a resonant magnetizing circuit including a magnetizing coil of a magnetic transducer head, a coupling coil and condenser connected in a closed loop, said coupling coil being inductively coupled to said oscillating coil, and an audio circuit connected across a portion of said resonant circuit* [and a magnetizing circuit including a coupling coil in series with a magnetizing coil, said coupling coil being inductively coupled with said oscillating coil, and a condenser in parallel with said coupling and magnetizing coils to form therewith a resonant circuit].

2. In an electrical circuit for a magnetic recording device wherein successive increments of a traveling recording medium are magnetized in accordance with impulses being recorded, an oscillatory circuit including an oscillating coil, and a magnetizing circuit including a coupling coil *and* [in series with] a magnetizing coil *of a magnetic transducer head,* said coupling coil being inductively coupled with said oscillating coil, a condenser in [parallel] *a loop circuit* with said coupling and magnetizing coils to form therewith a resonant circuit, and *a second circuit including* a resistance connected to one side of said resonant circuit, *said resistance being* of sufficient value to isolate said resonant circuit sufficiently for that circuit to perform its function independently of *said second* [the remainder of said] electrical circuit.

3. In an electrical circuit for a magnetic recording device wherein successive increments of a traveling recording medium are magnetized in accordance with impulses being recorded, an oscillatory circuit including an oscillating coil, and a magnetizing circuit including a coupling coil [in series with] *and* a magnetizing coil *of a magnetic transducer head,* said coupling coil being inductively coupled with said oscillating coil, a condenser in [parallel] *a closed loop circuit* with said coupling and magnetizing coils to form therewith a resonant circuit, an amplifying arrangement, a transformer of which the primary is fed by said amplifying arrangement, [said resistance being connected to the primary of said transformer, and] a condenser connected in parallel with [the first said condenser from a point between] said primary [and said resistance] to tune said primary to resonant condition, and a resistance between said resonant circuits to enable them to operate independently, *said resistance being connected to the primary of said transformer.*

4. *The combination comprising an electromagnetic transducer head having a core and a coil mounted on said core, impedance means and capacity reactance serially connected in a closed resonant loop with said coil, means for feeding an electric signal to be recorded to said closed loop across said capacity reactance to energize said coil with the signal to be recorded, and means for feeding a high frequency electric current to said closed loop across said impedance means to there-*

*by superimpose the same on said signal to be recorded within said closed loop.*

MARVIN CAMRAS.
RAYMOND E. ZENNER.

REFERENCES CITED

The following references are of record in the file of this patent or the original patent:

UNITED STATES PATENTS

| Number | Name | Date |
|---|---|---|
| 661,619 | Poulsen | Nov. 13, 1900 |
| 1,640,881 | Carlson | Aug. 30, 1927 |
| 1,886,856 | Warwick | Nov. 8, 1932 |
| 2,038,647 | Clausen | Apr. 28, 1936 |
| 2,235,126 | Towne | Mar. 18, 1941 |
| 2,235,132 | Wooleidge | Mar. 18, 1941 |
| 2,268,619 | Reid | Jan. 2, 1942 |
| 2,275,961 | Heller | Mar. 10, 1942 |
| 2,306,162 | Gipe | Dec. 22, 1942 |
| 2,321,812 | Heller | June 15, 1943 |
| 2,335,277 | Heller | Nov. 30, 1943 |

FOREIGN PATENTS

| Number | Country | Date |
|---|---|---|
| 23,064 | Australia | June 15, 1935 |
| 70,462 | Norway | May 20, 1946 |
| 97,306 | Sweden | Nov. 7, 1934 |
| 382,600 | Great Britain | Oct. 27, 1932 |
| 829,965 | France | July 18, 1938 |